United States Patent
Kumagai

(10) Patent No.: US 9,018,911 B2
(45) Date of Patent: Apr. 28, 2015

(54) ELECTRIC CIRCUIT, CHARGE CONTROL DEVICE, CHARGE SYSTEM, AND CONTROL METHOD

(75) Inventor: Eiji Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 13/215,409

(22) Filed: Aug. 23, 2011

(65) Prior Publication Data

US 2012/0056595 A1    Mar. 8, 2012

(30) Foreign Application Priority Data

Sep. 3, 2010 (JP) ................................ 2010-198119

(51) Int. Cl.
| | | |
|---|---|---|
| *H01M 10/46* | (2006.01) | |
| *H02J 7/00* | (2006.01) | |
| *H02M 1/08* | (2006.01) | |
| *H02M 3/335* | (2006.01) | |

(52) U.S. Cl.
CPC .............. *H02J 7/0031* (2013.01); *H02M 1/08* (2013.01); *H02J 2007/0037* (2013.01); *H02J 2007/0039* (2013.01); *H02J 2007/004* (2013.01); *H02M 3/335* (2013.01)

(58) Field of Classification Search
CPC ....................................................... H02J 7/0031
USPC ................... 320/134, 158, 163, 116, 132, 136
See application file for complete search history.

(56) References Cited

U.S. PATENT DOCUMENTS

| | | | | |
|---|---|---|---|---|
| 6,969,972 B2* | 11/2005 | Formenti | ...................... | 320/128 |
| 7,091,697 B2* | 8/2006 | Mader et al. | .................. | 320/120 |
| 7,567,116 B2* | 7/2009 | Yoshio | .......................... | 327/535 |
| 7,759,903 B2* | 7/2010 | Kamata | ......................... | 320/134 |
| 8,384,360 B2* | 2/2013 | Cegnar et al. | ................. | 320/166 |
| 8,450,977 B2* | 5/2013 | Niculae et al. | ................ | 320/136 |
| 8,456,135 B2* | 6/2013 | Liu | ................................. | 320/135 |
| 8,513,922 B2* | 8/2013 | Yang et al. | .................... | 320/152 |
| 8,559,151 B2* | 10/2013 | Huber et al. | ................. | 361/93.1 |
| 8,698,459 B2* | 4/2014 | Kim | ............................... | 320/136 |
| 8,716,980 B2* | 5/2014 | Lim | ................................ | 320/116 |
| 2005/0093512 A1 | 5/2005 | Mader et al. | | |

FOREIGN PATENT DOCUMENTS

| | | |
|---|---|---|
| CN | 1875531 | 12/2006 |
| JP | 04-063475 | 2/1992 |

(Continued)

OTHER PUBLICATIONS

Japanese Patent Office, Grounds for refusal notice issued in connection with Japanese Patent Application No. 2010-198119, dated Apr. 3, 2014. (2 pages).

(Continued)

*Primary Examiner* — Edward Tso

(74) *Attorney, Agent, or Firm* — K&L Gates LLP

(57) ABSTRACT

There is provided an electric circuit including a semiconductor switch that is inserted in a positive side power line; and converting means for converting an input voltage input to an input side terminal to a predetermined output voltage and for outputting the output voltage from an output side terminal, wherein the output side negative terminal of the converting means is connected to the positive side power line, and the output side positive terminal of the converting means is connected to a terminal that controls an opening and closing of the semiconductor switch.

7 Claims, 3 Drawing Sheets

(56) References Cited

FOREIGN PATENT DOCUMENTS

| | | |
|---|---|---|
| JP | 2009-100644 | 6/2009 |
| JP | 2009-183025 | 8/2009 |
| JP | 2009-240081 | 10/2009 |
| JP | 2010-141957 | 6/2010 |

OTHER PUBLICATIONS

The State Intellectual Property Office of the People'S Republic of China, Notification of the First Office Action issued in connection with PRC Patent Application No. 2011102497072, dated Oct. 22, 2014. (16 pages).

* cited by examiner

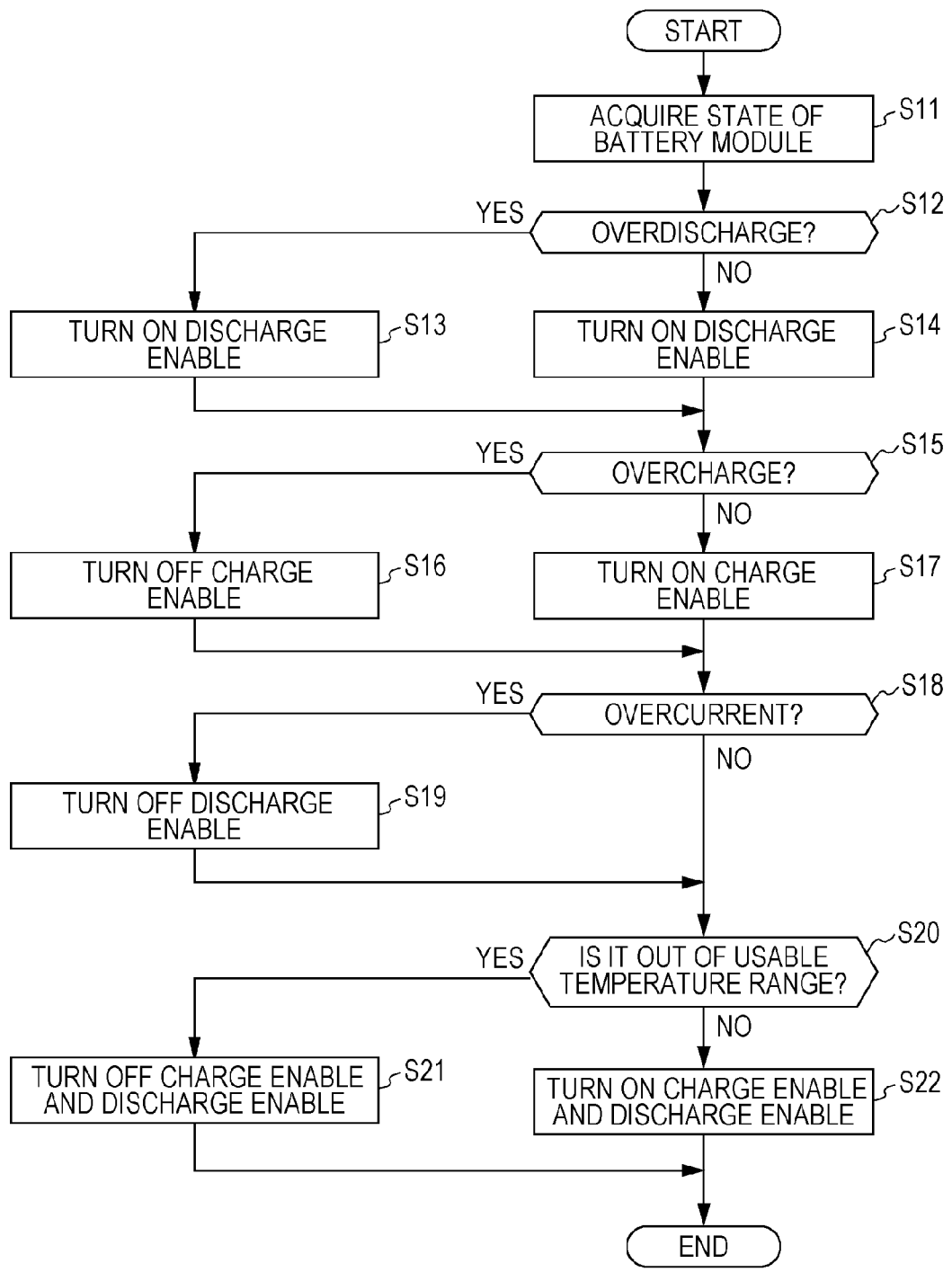

ELECTRIC CIRCUIT, CHARGE CONTROL DEVICE, CHARGE SYSTEM, AND CONTROL METHOD

CROSS REFERENCES TO RELATED APPLICATIONS

The present application contains subject matter related to that disclosed in Japanese Priority Patent Application JP 2010-198119 filed in the Japan Patent Office on Sep. 3, 2010, the entire contents of which are hereby incorporated by reference.

BACKGROUND

The present application relates to an electric circuit, a charge control device, a charge system, and a control method, and more particularly, to an electric circuit, a charge control device, a charge system, and a control method, which are configured to realize a circuit that drives a semiconductor switch with a relatively simple configuration.

In recent years, as an important point in increasing the availability of electric vehicles or a smart grid, the development of a relatively safer and more convenient secondary battery is expected.

Generally, a relay that opens and closes by physically moving a contact using an electromagnet is inserted in a power line that charges and discharges the secondary battery, and thereby powering on and off is controlled (refer to Japanese Unexamined Patent Application Publication Nos. 2010-141957, 2009-100644, 2009-240081, and 2009-183025). For the control of powering on and off, a semiconductor switch or the like is used, in addition to the relay.

In regard to the relay, a high breakdown voltage relay is large in a scale and is expensive. On the contrary, in a case where a semiconductor switch such as an FET (Field Effect Transistor) is inserted to a power line on the a reference potential side (ground side: in the following description, for example, a negative side), and a control of powering on and off is performed by the semiconductor switch, this can be realized with a small size and at a low cost.

SUMMARY

However, in the case of using a semiconductor for charging and discharging the secondary battery, the semiconductor may be inserted to the power line on an applied potential side (opposite to the ground side: in the following description, for example, positive side) or to the power line on the negative side. However, in the case of inserting the semiconductor switch to the power line on negative side, for example, when the semiconductor is turned off, there is a problem such as the reference potential of a battery side and a system side fluctuating. In addition, in the case of using a semiconductor switch such as an IGBT (Insulated Gate Bipolar Transistor) as the semiconductor switch, a driving circuit is necessary that can drive the semiconductor switch inserted to the positive side of the secondary battery with a relatively simple circuit configuration.

The present application has been made in consideration of this situation, and it is desirable to realize a circuit that drives a semiconductor switch with a relatively simple configuration.

According to an embodiment, there is provided an electric circuit including a semiconductor switch that is inserted in a positive side power line; and converting means for converting an input voltage input to an input side terminal to a predetermined output voltage and for outputting the output voltage from an output side terminal, wherein the output side negative terminal of the converting means is connected to the positive side power line, and the output side positive terminal of the converting means is connected to a terminal that controls an opening and closing of the semiconductor switch.

According to this embodiment, the electric circuit includes a semiconductor switch that is inserted in a positive side power line; and converting means for converting an input voltage input to an input side terminal to a predetermined output voltage and for outputting the output voltage from an output side terminal. The output side negative terminal of the converting means is connected to the positive side power line, and the output side positive terminal of the converting means is connected to a terminal that controls an opening and closing of the semiconductor switch.

According to another embodiment, there is provided a charge control device including an electric circuit including a semiconductor switch that is inserted in a positive side power line, and converting means for converting an input voltage input to an input side terminal to a predetermined output voltage and for outputting the output voltage from an output side terminal, the output side negative terminal of the converting means being connected to the positive side power line, and the output side positive terminal of the converting means being connected to a terminal that controls an opening and closing of the semiconductor switch; and control means for controlling a switching of the semiconductor switch by controlling the on and off states of the output voltage of the converting means provided to the electric circuit.

According to this embodiment, the electric circuit includes a semiconductor switch that is inserted in a positive side power line, and converting means for converting an input voltage input to an input side terminal to a predetermined output voltage and for outputting the output voltage from an output side terminal. The output side negative terminal of the converting means is connected to the positive side power line, and the output side positive terminal of the converting means is connected to a terminal that controls an opening and closing of the semiconductor switch. A switching of the semiconductor switch is controlled by the control of on and off of the output voltage of the converting means.

According to another embodiment, there is provided a charge system including a secondary battery that charges and discharges power; detecting means for detecting the state of the secondary battery; an electric circuit including a semiconductor switch that is inserted in a positive side power line connected to the secondary battery, and converting means for converting an input voltage input to an input side terminal to a predetermined output voltage and for outputting the output voltage from an output side terminal, the output side negative terminal of the converting means being connected to the positive side power line, and the output side positive terminal of the converting means being connected to a terminal that controls an opening and closing of the semiconductor switch; and control means for controlling a switching of the semiconductor switch by controlling the on and off states of the output voltage of the converting means provided to the electric circuit, wherein the control means acquires the state of the secondary battery detected by the detecting means, and controls the switching of the semiconductor switch according to the state of the secondary battery.

According to another embodiment, there is provided a method of controlling a charge system. The charge system includes a secondary battery that charges and discharges power; detecting means for detecting the state of the secondary battery; an electric circuit including a semiconductor switch that is inserted in a positive side power line connected to the secondary battery, and converting means for converting an input voltage input to an input side terminal to a predetermined output voltage and for outputting the output voltage from an output side terminal, the output side negative terminal of the converting means being connected to the positive side power line, and the output side positive terminal of the converting means being connected to a terminal that controls an opening and closing of the semiconductor switch; and control means for controlling a switching of the semiconductor switch by controlling the on and off states of the output voltage of the converting means provided to the electric circuit. The method includes acquiring the state of the secondary battery detected by the detecting means, and controlling the switching of the semiconductor switch according to the state of the secondary battery.

According to these embodiments, the electric circuit includes a semiconductor switch that is inserted in a positive side power line connected to the secondary battery, and converting means for converting an input voltage input to an input side terminal to a predetermined output voltage and for outputting the output voltage from an output side terminal. The output side negative terminal of the converting means is connected to the positive side power line, and the output side positive terminal of the converting means is connected to a terminal that controls an opening and closing of the semiconductor switch. The switching of the semiconductor switch is controlled by the control of on and off of the output voltage of the converting means. At this time, the state of the secondary battery that charges and discharges the power is acquired, and the switching of the semiconductor switch is controlled according to the state.

According to another embodiment, there is provided an electric circuit including a semiconductor switch that performs switching between conduction and disconnection of a switching object line; and a control circuit that supplies a switching control signal, which represents a control potential for the switching, to the semiconductor switch as a potential difference signal with respect to a reference potential of the semiconductor switch, and that controls the switching, wherein the reference potential of the semiconductor switch is consistent with a potential of the switching object line, and the control circuit generates the switching control signal according to an input control signal input as a potential difference signal with respect to a potential different from the potential of the switching object line.

According to this embodiment, the electric circuit includes a semiconductor switch that performs switching between conduction and disconnection of a switching object line; and a control circuit that supplies a switching control signal, which represents a control potential for the switching, to the semiconductor switch as a potential difference signal with respect to a reference potential of the semiconductor switch, and that controls the switching. The reference potential of the semiconductor switch is consistent with a potential of the switching object line, and the switching control signal is generated according to an input control signal input as a potential difference signal with respect to a potential different from the potential of the switching object line.

According to another embodiment, there is provided an electric circuit including a semiconductor switch that with respect to a power line that supplies power by a potential difference between a reference potential line showing a reference potential and an applied potential line showing an applying potential, sets at least one of the reference potential line and the applied potential line as a switching object line and that performs switching between conduction and disconnection of the switching object line; and a control circuit that supplies a switching control signal, which represents a control potential for the switching, to the semiconductor switch as a potential difference signal with respect to a reference potential of the semiconductor switch, and that controls the switching, wherein the reference potential of the semiconductor switch is consistent with a potential of the switching object line, and the control circuit generates the switching control signal according to an input control signal input as a potential difference signal with respect to the same potential as that of the reference potential line.

According to this embodiment, the electric circuit includes a semiconductor switch that with respect to a power line that supplies power by a potential difference between a reference potential line showing a reference potential and an applied potential line showing an applying potential, sets at least one of the reference potential line and the applied potential line as a switching object line and that performs switching between conduction and disconnection of the switching object line; and a control circuit that supplies a switching control signal, which represents a control potential for the switching, to the semiconductor switch as a potential difference signal with respect to a reference potential of the semiconductor switch, and that controls the switching. The reference potential of the semiconductor switch is consistent with a potential of the switching object line, and the switching control signal is generated according to an input control signal input as a potential difference signal with respect to the same potential as that of the reference potential line.

According to another embodiment, there is provided a charge control device including an electric circuit described above; and control means for controlling a switching of the semiconductor switch by supplying the input control signal to the electric circuit.

According to this embodiment, the switching of the semiconductor switch is controlled by the supply of the input control signal to the electric circuit.

According to another embodiment, there is provided a charge system including an electric circuit described above; control means for controlling a switching of the semiconductor switch by supplying the input control signal to the electric circuit; a secondary battery that charges and discharges power; and detecting means for detecting the state of the secondary battery, wherein the switching object line of the electric circuit is connected to the secondary battery, the control means acquires the state of the secondary battery detected by the detecting means, and controls the switching of the semiconductor switch according to the state of the secondary battery.

According to another embodiment, there is provided a method of controlling a charge system. The charge system includes an electric circuit described above, control means that controls a switching of the semiconductor switch by supplying the input control signal to the electric circuit, a secondary battery that charges and discharges power, and detecting means for detecting the state of the secondary battery, the switching object line of the electric circuit being connected to the secondary battery. The method includes acquiring the state of the secondary battery detected by the detecting means, and controlling the switching of the semiconductor switch according to the state of the secondary battery.

According to these embodiments, the charge system includes an electric circuit described above, control means that controls a switching of the semiconductor switch by supplying the input control signal to the electric circuit, a secondary battery that charges and discharges power, and detecting means for detecting the state of the secondary battery. The switching object line of the electric circuit is connected to the secondary battery, the state of the secondary battery is acquired, and the switching of the semiconductor switch is controlled according to the state of the secondary battery.

According to the above-described embodiments, it is possible to realize a circuit that drives a semiconductor switch with a relatively simple configuration.

Additional features and advantages are described herein, and will be apparent from the following Detailed Description and the figures.

BRIEF DESCRIPTION OF THE FIGURES

FIG. 3 is a flow chart illustrating a process of controlling the charge and discharge switching circuit.

DETAILED DESCRIPTION

Embodiments of the present application will be described below in detail with reference to the drawings.

Figure 1:
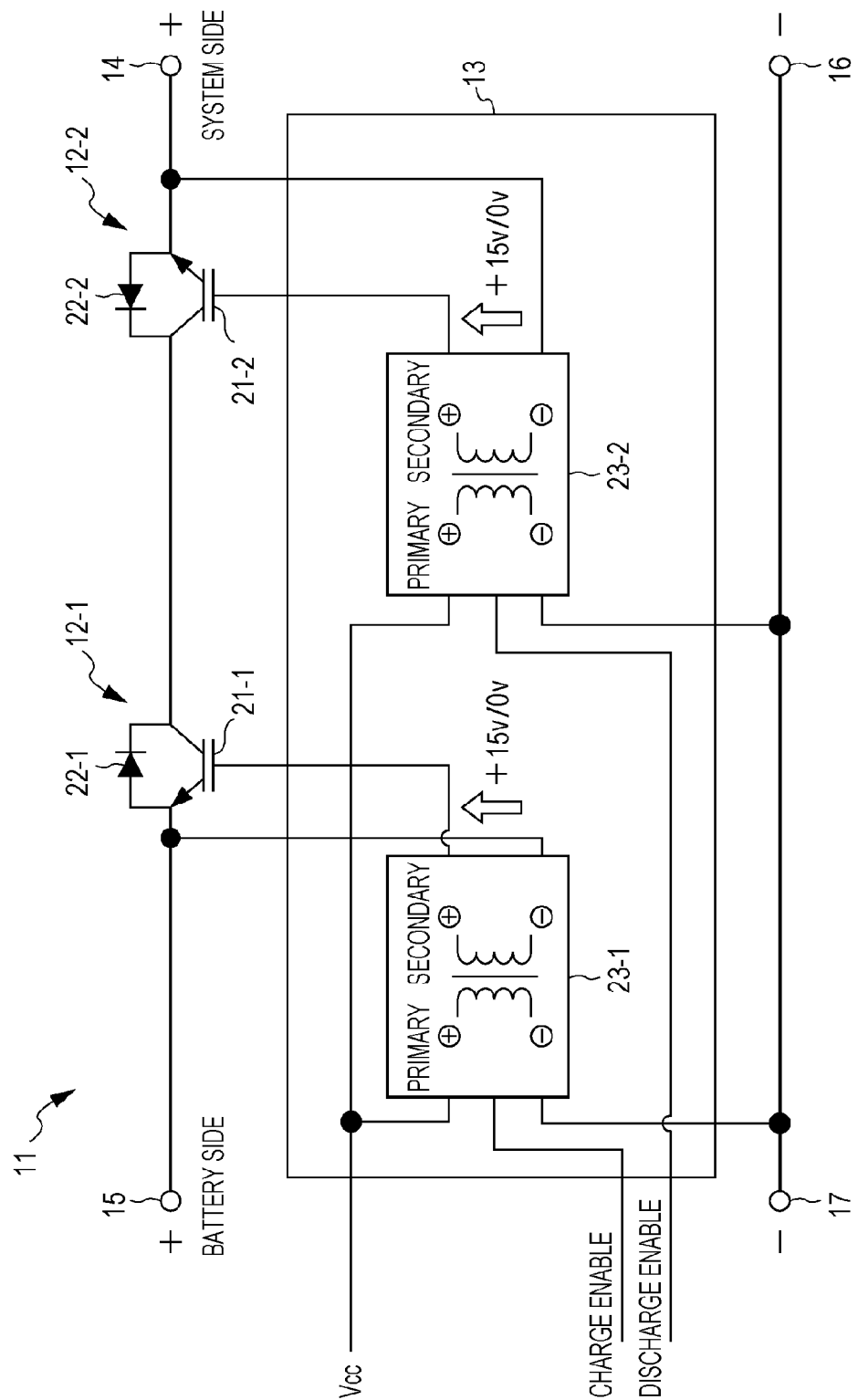
FIG. 1 is a block diagram illustrating a configuration example of an embodiment of a charge and discharge switching circuit to which an embodiment is applied.

FIG. 1 shows a block diagram illustrating a configuration example of an embodiment of a charge and discharge switching circuit (electric circuit) to which an embodiment is applied.

In FIG. 1, the charge and discharge switching circuit 11 includes two semiconductor switches 12-1 and 12-2, and a driving circuit 13.

The charge and discharge switching circuit 11 is disposed between a secondary battery (for example, battery modules 32-1 to 32-N of FIG. 2) such as a lithium-ion battery, and a system (not shown in the drawing) that charges and discharges the secondary battery, and switches the charging and discharging. In addition, the secondary battery and system are connected to each other through a positive side power line (applied potential line) and a negative side power line (ground line, reference potential line). In FIG. 1, the terminal 14 of the positive side power line is connected to the system and a terminal 15 of the positive side power line is connected to the secondary battery. In addition, a terminal 16 of the negative side power line is connected to the system, and a terminal 17 of the negative side power line is connected to the secondary battery.

In addition, in the charge and discharge switching circuit 11, the semiconductor switches 12-1 and 12-2 are inserted in series in the positive side power line. The semiconductor switch 12-1 is disposed in the positive side power line at the secondary battery side. The semiconductor switch 12-2 is disposed in the positive side power line at the system side.

The semiconductor switch 12-1 is configured by a combination of an IGBT (Insulated Gate Bipolar Transistor) 21-1 and a diode 22-1. In the semiconductor switch 12-1, a collector of the IGBT 21-1 and a cathode of the diode 22-1 are connected, an emitter of the IGBT 21-1 and an anode of the diode 22-1 are connected, and a gate of the IGBT 21-1 is connected to the driving circuit 13.

In addition, in the semiconductor switch 12-1, a connection point between the emitter of the IGBT 21-1 and the anode of the diode 22-1 is connected to the secondary battery side terminal 15, and a connection point between the collector of the IGBT 21-1 and the cathode of the diode 22-1 is connected to the system side terminal 14 through the semiconductor switch 12-2. Therefore, in the semiconductor switch 12-1, a current is allowed to flow at any time from the secondary battery side terminal 15 to the system side terminal 14 through the diode 22-1. On the other hand, the current is allowed to flow from the system side terminal 14 to the secondary battery side terminal 15 only in a case where the IGBT 21-1 is turned on.

In addition, the semiconductor switch 12-2 is configured by the combination of an IGBT 21-2 and a diode 22-2 similarly to the semiconductor switch 12-1. On the other hand, in the semiconductor switch 12-2, a connection point between an emitter of the IGBT 21-2 and an anode of the diode 22-2 is connected to the system side terminal 14, and a connection point between a collector of the IGBT 21-2 and a cathode of the diode 22-2 is connected to the secondary battery side terminal 15 through the semiconductor switch 12-1. Therefore, in the semiconductor switch 12-2, the current is allowed to flow at any time from the system side terminal 14 through the diode 22-2 to the secondary battery side terminal 15. On the other hand, the current is allowed to flow from the secondary battery side terminal 15 to the system side terminal 14 only in a case where the IGBT 21-2 is turned on.

The driving circuit 13 includes two insulation type DCDC (Direct Current/Direct Current) converters 23-1 and 23-2.

The insulation type DCDC converters 23-1 and 23-2 convert a power source voltage Vcc input to an input side (primary coil side) terminal to a predetermined voltage, for example, +15 V or the like, and then output the converted voltage to an output side (secondary coil side) terminal. In addition, the insulation type DCDC converters 23-1 and 23-2 have an insulation breakdown resistance, for example 1000 V or more, which is larger than the power source voltage of the power supplied between the secondary battery and the system through the charge and discharge switching circuit 11.

In the insulation type DCDC converter 23-1, an input side+ terminal is connected to the power source voltage Vcc, and an input side−terminal is connected to the negative side power line. In addition, in the insulation type DCDC converter 23-1, an output side+terminal is connected to the gate of the IGBT 21-1 of the semiconductor switch 12-1, and an output side− terminal is connected to the positive side power line between the semiconductor switch 12-1 and the secondary battery side terminal 15.

In addition, in the insulation type DCDC converter 23-2, an input side+terminal is connected to the power source voltage Vcc and an input side−terminal is connected to the negative side power line. In addition, in the insulation type DCDC converter 23-2, an output side+terminal is connected the gate of the IGBT 21-2 of the semiconductor switch 12-2, and an output side−terminal is connected to the positive side power line between the semiconductor switch 12-2 and the system side terminal 14.

In addition, in the insulation type DCDC converters 23-1 and 23-2, it is possible to apply a voltage, which is obtained by adding a predetermined voltage to the voltage of the positive side power line by DCDC converting the power source voltage Vcc, to the gates of the IGBTs 21-1 and 21-2 (that is, it is possible to supply a switching control signal showing a control potential as a potential signal with respect to the reference potential of the IGBTs 21-1 and 21-2 (potential of the positive side power line)). Here, the voltage of the positive side power line varies according to power accumulated in the secondary battery. For example, it can be assumed that in a charge system in which the charge and discharge switching circuit 11 is mounted, the voltage is 400 to 600 V. Therefore, the insulation type DCDC converters 23-1 and 23-2 apply a voltage, which is obtained by adding a predetermined voltage (for example, +15 V) to 400 to 600 V, to the gates of the IGBTs 21-1 and 21-2, respectively.

In addition, the insulation type DCDC converters 23-1 and 23-2 switch on and off (for example, +15 V/0 V) of the output voltage according to a control signal (charge enable and discharge enable: input control signal) by an MCU 51 of FIG. 2, which is described later).

That is, when the charge enable is turned on, the insulation type DCDC converter 23-1 turns on a circuit that converts the power source voltage Vcc input to the input side terminal to a necessary voltage, generates an output voltage (supplies a switching control signal), applies a predetermined voltage to the gate of the IGBT 21-1 and thereby puts the secondary battery into a charge state. On the other hand, when the charge enable is turned off, the insulation type DCDC converter 23-1 turns off a circuit that converts the power source voltage Vcc input to the input side terminal to a necessary voltage, stops the generation of the output voltage, and stops the application of the voltage to the gate of the IGBT 21-1, and thereby puts the secondary battery into a non-charge state.

Similarly, when a discharge enable is turned on, the insulation type DCDC converter 23-2 turns on a circuit that converts the power source voltage Vcc input to the input side terminal to a necessary voltage, generates an output voltage (supplies a switching control signal), applies a predetermined voltage to the gate of the IGBT 21-2 and thereby puts the secondary battery into a discharge state. On the other hand, when the discharge enable is turned off, the insulation type DCDC converter 23-2 turns off a circuit that converts the power source voltage Vcc input to the input side terminal to a necessary voltage, stops the generation of the output voltage, and stops the application of the voltage to the gate of the IGBT 21-2, and thereby puts the secondary battery into a non-discharge state.

When being configured as described above, the charge and discharge switching circuit 11 generates a voltage larger than the positive side power line by a predetermined voltage using the insulation type DCDC converters 23-1 and 23-2, and accordingly it is possible to control on and off of the semiconductor switches 12-1 and 12-2 that are inserted in the positive side power line.

In addition, since the on and off control is performed at the positive side power line, it is possible to allow the stability to be relatively high, compared to a case where the on and off control is performed at the negative side power line. In addition, for example, it is possible to avoid the fluctuation of the reference potential, which occurs at the time of performing the on and off control by inserting a semiconductor switch in the negative side power line.

That is, in a case where the semiconductor switch is inserted in the negative side power line, when the semiconductor switch is turned off, the reference potential of the power source and the reference potential of the system side circuit move into the state of not being connected, and therefore the reference potentials of the system side and the power source side may fluctuate. Due to this, there was concern that the circuit may not operate, or the like. On the contrary to this, in the charge and discharge switching circuit 11, since the semiconductor switches 12-1 and 12-2 are inserted in the positive side power line, even when the semiconductor switches 12-1 and 12-2 are turned off, the reference potential of the power source and the reference potential of the system side circuit are in a connected state. Accordingly, it is possible to avoid occurrence of the problem.

In addition, when the insulation type DCDC converters 23-1 and 23-2 are used, it is possible to realize the circuit that generates a high voltage (for example, a voltage obtained by adding 15 V to 400 to 600 V) for driving the semiconductor switches 12-1 and 12-2 with a simple configuration. In addition, since the insulation type DCDC converters 23-1 and 23-2 are configured in a manner that adds a predetermined voltage to a voltage that is supplied to the positive side power line, even when a voltage necessary for the driving of the semiconductor switches 12-1 and 12-2 varies according to the amount of power accumulated in the secondary battery, it is possible to reliably generate this voltage.

In addition, since the semiconductor switches 12-1 and 12-2 are configured by the combination of the IGBTs 21-1 and 21-2 and the diodes 22-1 and 22-2, two power supply paths for the charge and the discharge are independently provided. Accordingly, it is possible to configure a circuit capable of independently controlling the charge enable and the discharge enable.

In addition, the insulation type DCDC converters 23-1 and 23-2 have the insulating breakdown resistance larger than power source voltage of the power supplied between the secondary battery and the system, such that it is possible reliably prevent the power transmitted by the positive side power line from being leaked through the insulation type DCDC converters 23-1 and 23-2. That is, the voltage (switching control signal) applied to the gates of the IGBTs 21-1 and 21-2 by the insulation type DCDC converters 23-1 and 23-2 is generated in the state of electrically insulated from the input control signal (charge enable and discharge enable) supplied to the insulation type DCDC converters 23-1 and 23-2.

In addition, the charge and discharge switching circuit 11 may include a protection circuit that blocks out this supply of the power when power equal to or greater than a defined voltage value is supplied.

Figure 2:
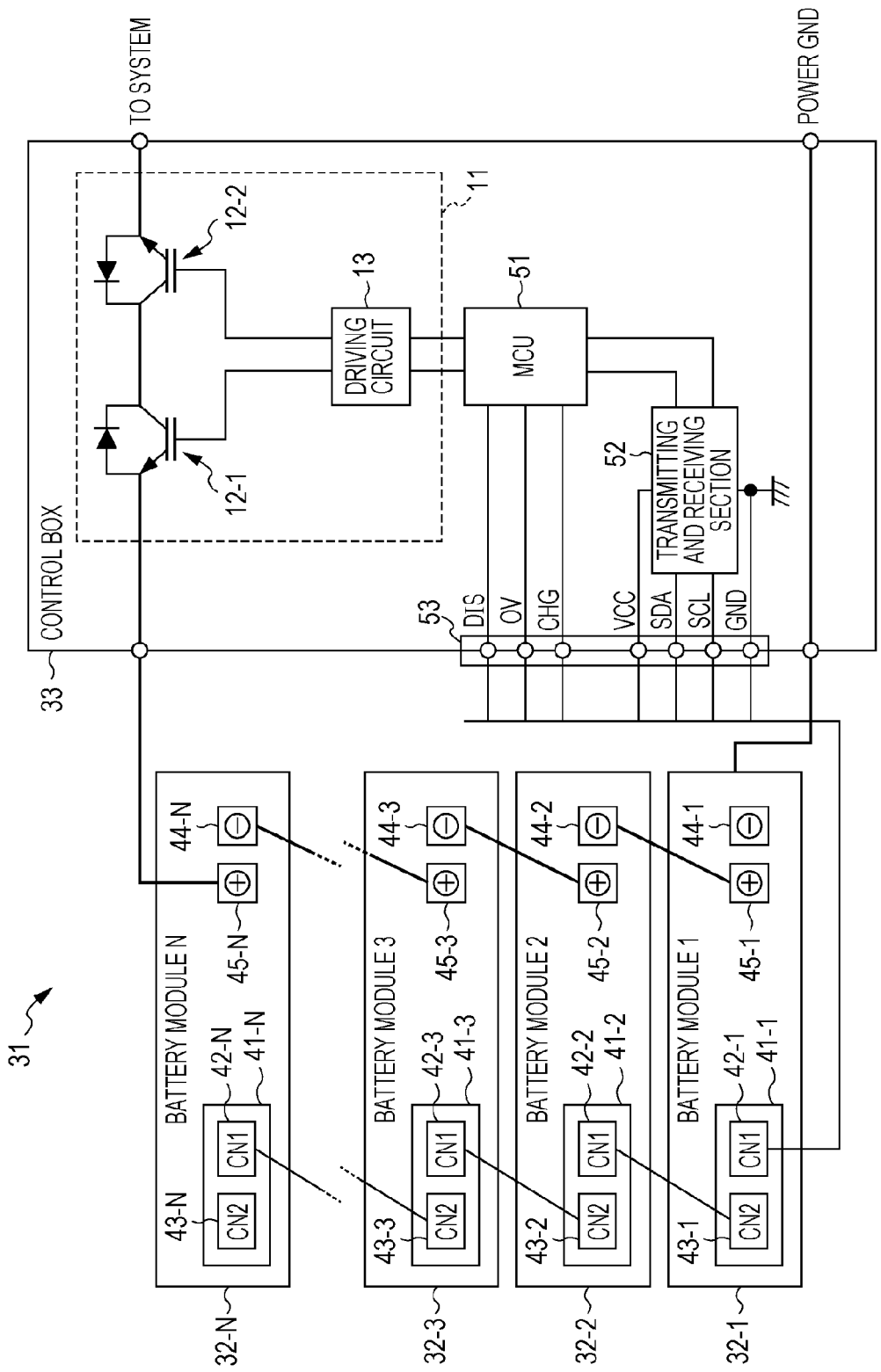
FIG. 2 is a block diagram illustrating a configuration example of a charge system provided with the charge and discharge switching circuit.

Next, FIG. 2 shows a block diagram illustrating a configuration example of a charge system provided with the charge and discharge switching circuit 11. In addition, in this specification, the system represents the entirety of a device configured by a plurality of devices.

As shown in FIG. 2, a charge system 31 includes N battery modules 32-1 to 32-N, and a control box 33.

The battery modules 32-1 to 32-N include each one of sensor units 41-1 to 41-N, each one of first communication terminals (CN1) 42-1 to 42-N, each one of second communication terminals (CN2) 43-1 to 43-N, each one of negative terminals 44-1 to 44-N, and each one of positive terminals 45-1 to 45-N, respectively. The control box 33 includes the charge and discharge switching circuit 11, an MCU (Micro Controller Unit) 51, a transmitting and receiving section 52, and a communication connector 53. The control box 33 and the battery modules 32-1 to 32-N are connected through a power line and a signal line.

The negative side power line connected to the reference potential (Power GND) is connected to the negative terminal 44-1 of the battery module 32-1 through the control box 33, and the positive terminal 45-1 of the battery module 32-1 is connected to the negative terminal 44-2 of the battery module 32-2. In addition, the positive terminal 45-2 of the battery module 32-2 is connected to the negative terminal 44-3 of the battery module 32-3. In this manner, the battery modules 32-1 to 32-N are connected in series. In addition, the positive side power line connected to the positive terminal 45-N of the battery module 32-N is connected to a system (not shown) through the charge and discharge switching circuit 11 of the control box 33 (To System).

In addition, a signal line connected to the communication connector 53 of the control box 33 is connected to the first communication terminal 42-1 of the battery module 32-1. In addition, the second communication terminal 43-1 of the battery module 32-1 is connected to the first communication terminal 42-2 of the battery module 32-2, and the second communication terminal 43-2 of the battery module 32-2 is connected to the first communication terminal 42-3 of the battery module 32-3. In this way, the battery modules 32-1 to 32-N are connected to the signal line in series.

For example, the battery modules 32-1 to 32-N are modules provided with a secondary battery such as a lithium-ion battery, and charges and discharges power through the negative terminals 44-1 to 44-N and the positive terminals 45-1 to 45-N.

The sensor units 41-1 to 41-N detect voltage value of power accumulated in the battery modules 32-1 to 32-N, a current value at the time of the charging and discharging, the temperature of the battery modules 32-1 to 32-N, or the like. The sensor units 41-1 to 41-N are connected to each other by the first communication terminals 42-1 to 42-N, and the second communication terminals 43-1 to 43-N, and are connected to the control box 33 through the signal line. In addition, the sensor units 41-1 to 41-N notify the MCU 51 of the control box 33 of the voltage value, the current value, and the temperature that are detected.

The MCU 51 is, for example, an embedded microprocessor in which computer systems are organized into a single integrated circuit. The MCU 51 acquires the voltage value, the current value, and the temperature of the battery modules 32-1 to 32-N through the communication with the sensor units 41-1 to 41-N. In addition, the MCU 51 monitors the state (such as overcurrent, short, and overcharge, overdischarge, and temperature of the secondary battery connected to the power source) of the battery modules 32-1 to 32-N based on the voltage value, the current value, and the temperature, and controls the charge and discharge switching circuit 11 according to this state.

The transmitting and receiving section 52 is an interface that manages the transmission and reception of a signal when the MCU 51 and the sensor units 41-1 to 41-N communicate with each other. The communication connector 53 includes a signal line connected to the control box 33, and a plurality of terminals that are connected to the MCU 51 and the transmitting and receiving section 52. A DIS terminal of the communication connector 53, a 0V terminal, and a CHG terminal are connected to the MCU 51, and a VCC terminal, an SDA terminal, an SCL terminal, and a GND terminal of the communication connector 53 are connected to the transmitting and receiving section 52.

The charge system 31 configured as described is used as a high voltage power source (for example, a power source of approximately 1000 V·100 A) by connecting the battery modules 32-1 to 32-N in series. The control box 33 on and off controls a current in the charge direction and the discharge direction by the charge and discharge switching circuit 11 while monitoring the state of the battery modules 32-1 to 32-N.

Next, FIG. 3 shows a flow chart illustrating a process in which the MCU 51 controls the charge and discharge switching circuit 11 according to the state of the battery modules 32-1 to 32-N.

For example, the MCU 51 periodically performs the communication with the sensor units 41-1 to 41-N, and starts the process at the time of starting the communication. In step S11, the MCU 51 acquires a signal indicating the voltage value, the current value, and the temperature of the battery modules 32-1 to 32-N through the communication with the sensor units 41-1 to 41-N, and figures out the state of the battery modules 32-1 to 32-N.

After the step S11, the process proceeds to step S12, and the MCU 51 determines whether or not the state of the battery modules 32-1 to 32-N is overdischarged.

In step S12, in a case where the MCU 51 determines that the state of the battery modules 32-1 to 32-N is overdischarged, the process proceeds to step S13, and the MCU 51 performs a control of allowing the insulation type DCDC converter 23-2 to turn off a discharge enable. In this manner, the discharge from the battery modules 32-1 to 32-N is stopped.

On the other hand, in step S12, in a case where the MCU 51 determines that the state of the battery modules 32-1 to 32-N is not overdischarged, the process proceeds to step S14, and the MCU 51 performs a control of allowing the insulation type DCDC converter 23-2 to turn on the discharge enable. In this manner, the discharge from the battery modules 32-1 to 32-N begins to start (keeps the discharge state in a case where the discharge enable is on state from the beginning).

After the process in the step S13 or S14, the process proceeds to step S15, and the MCU 51 determines whether or not the state of the battery modules 32-1 to 32-N is overdischarged.

In the step S15, in a case where the MCU 51 determines that the state of the battery modules 32-1 to 32-N is overdischarged, the process proceeds to step S16, and the MCU 51 performs a control of allowing the insulation type DCDC converter 23-1 to turn off an charge enable. In this manner, the charge from the battery modules 32-1 to 32-N is stopped.

On the other hand, in step S15, in a case where the MCU 51 determines that the state of the battery modules 32-1 to 32-N is not overdischarged, the process proceeds to step S17, and the MCU 51 performs a control of allowing the insulation type DCDC converter 23-1 to turn on the charge enable. In this manner, the charge to the battery modules 32-1 to 32-N begins to start (keeps the charge state in a case where the charge enable is on state from the beginning).

After the process of the step S16 or S17, the process proceeds to step S18, and the MCU 51 determines whether or not the state of the battery modules 32-1 to 32-N is overcurrent.

In the step S18, in a case where the MCU 51 determines that the state of the battery modules 32-1 to 32-N is overcurrent, the process proceeds to step S19, and the MCU 51 performs a control of allowing the insulation type DCDC converter 23-2 to turn off a discharge enable. In this manner, the discharge from the battery modules 32-1 to 32-N is stopped.

After the process of the step S19, or in the step S18, in a case where it is determined that the state of the battery modules 32-1 to 32-N is not overcurrent, the process proceeds to step S20. In the step S20, the MCU 51 determines whether or not the state of the battery modules 32-1 to 32-N is out of a usable temperature range.

In the step S20, in a case where the MCU 51 determines that the state of the battery modules 32-1 to 32-N is out of the usable temperature range, the process proceeds to step S21. In the step S21, the MCU 51 performs a control of allowing the insulation type DCDC converter 23-1 to turn off the charge enable, and of allowing the insulation type DCDC converter 23-2 to turn off the discharge enable. In this manner, the charge and the discharge of the battery modules 32-1 to 32-N are stopped.

On the other hand, in the step S20, in a case where the MCU 51 determines that the state of the battery modules 32-1 to 32-N is not out of the usable temperature range (within a range), the process proceeds to step S22. In the step S22, the MCU 51 performs a control of allowing the insulation type DCDC converter 23-1 to turn on the charge enable, and of allowing the insulation type DCDC converter 23-2 to turn on the discharge enable. In this manner, the charge and the discharge of the battery modules 32-1 to 32-N begin to start (keeps the charge state and the discharge state in a case where the charge enable and the discharge are on state from the beginning).

After the process in the step S21 or step S22, the process of controlling the charge and discharge switching circuit 11 according to the state of the battery modules 32-1 to 32-N is terminated, and the MCU 51 keeps a standby state until the next timing where the communication with the sensor units 41-1 to 41-N starts.

As described above, in the charge system 31, since the control of the insulation type DCDC converters 23-1 and 23-2 of the charge and discharge switching circuit 11 is performed by the MCU 51, it is possible to use the battery modules 32-1 to 32-N in a relatively appropriate state. In addition, at this time, two current paths are provided in the charge and discharge switching circuit 11 by the semiconductor switches 12-1 and 12-2, and therefore the MCU 51 can perform a separate control with respect to the insulation type DCDC converters 23-1 and 23-2. Therefore, the on and off control of the current in the charge direction, and the on and off control of the current in the discharge direction may be independently performed.

In addition, in the semiconductor switches 12-1 and 12-2, the IGBTs 21-1 and 21-2 are used for each one, respectively. However, a configuration where a plurality of IGBTs are connected in parallel as a semiconductor switch may be adopted. In this manner, when the semiconductor switch in which the plurality of IGBTs are connected in parallel is adopted, it is possible to increase the permissible amount of current flowing in the positive side power line.

In addition, in this embodiment, a configuration example where the IGBT is used as a semiconductor switch is described, but an N-type channel FET may be adopted.

In addition, in a case where an FET (P-type channel element) is adopted as the semiconductor switch in the related art, since it has only to decrease the gate voltage from the source, it is possible to easily drive a semiconductor switch. However, in the case of handling a high voltage and a high current, adopting not the FET but the IGBT (N-type channel element) is considered, and in the case of adopting the IGBT, it is necessary to produce a voltage higher than that supplied to the positive side power line.

Therefore, in the charge and discharge switching circuit 11, a voltage-raising of, for example, 15 V from a voltage supplied to the positive side power line to which a high voltage is supplied is performed by using the insulation type DCDC converters 23-1 and 23-2, and therefore it is possible to drive the IGBT with a simple circuit configuration. In addition, when the voltage-raising is performed with respect to the voltage supplied to the positive side power line, it is possible to drive IGBT with low power consumption compared to the case of producing the voltage itself from a ground voltage.

In addition, this embodiment may be applied to a charger of the secondary battery, or a control device provided with the secondary battery, in addition to the charge system 31 shown in FIG. 2. In addition, in the above description, the reference potential side (ground side) is set as a positive side and the opposite side (applied potential side) is set as a negative side. However, this embodiment may be applied to an electric circuit, a control device or system of a negative application with a reverse polarity, or the like. In addition, for example, the positive side power line may be set as a switching object line, as well as at least one of the positive side power line and the negative side power line may be set as the switching object line.

In addition, the series of processes may be implemented by hardware or software. In the case of implementing the series of processes by the software, a program making up the software is installed in a computer embedded in dedicated hardware, or for example, a general purpose computer capable of implementing various functions by installing various programs, from a program recording medium. In addition, the program implemented by the computer may be a program that performs a process in time-series according to the described order, or a program performs a process in parallel or at a necessary timing such as when a request is made.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electric circuit, comprising:
a semiconductor switch that performs switching between conduction and disconnection of a switching object line; and
a control circuit that supplies a switching control signal, which represents a control potential for the switching, to the semiconductor switch as a first potential difference signal with respect to a reference potential of the semiconductor switch, and that controls the switching,
wherein the reference potential of the semiconductor switch is consistent with a potential of the switching object line, and
the control circuit generates the switching control signal according to an input control signal input as a second potential difference signal with respect to a potential different from the potential of the switching object line.

2. An electric circuit, comprising:
a semiconductor switch that with respect to a power line that supplies power by a potential difference between a reference potential line showing a reference potential and an applied potential line showing an applying potential, sets at least one of the reference potential line and the applied potential line as a switching object line and that performs switching between conduction and disconnection of the switching object line; and
a control circuit that supplies a switching control signal, which represents a control potential for the switching, to the semiconductor switch as a first potential difference signal with respect to a reference potential of the semiconductor switch, and that controls the switching,
wherein the reference potential of the semiconductor switch is consistent with a potential of the switching object line, and
the control circuit generates the switching control signal according to an input control signal input as a second potential difference signal with respect to the same potential as that of the reference potential line.

3. The electric circuit according to claim 1,
wherein the control circuit generates the switching control signal in a state of being electrically insulated from the input control signal.

4. The electric circuit according to claim 1,
wherein the semiconductor switch includes a first semiconductor switch that controls a supply of power in a first direction of the switching object line, and a second semiconductor switch that control a supply of power in a second direction reverse to the first direction, and the control circuit includes a first control circuit that controls a switching of the first semiconductor switch, and a second control circuit that controls the switching of the second semiconductor switch.

5. A charge control device, comprising:

an electric circuit according to claim 1; and control means for controlling a switching of the semiconductor switch by supplying the input control signal to the electric circuit.

6. A charge system, comprising:

an electric circuit according to claim 1;

control means for controlling a switching of the semiconductor switch by supplying the input control signal to the electric circuit;

a secondary battery that charges and discharges power; and detecting means for detecting a state of the secondary battery, wherein the switching object line of the electric circuit is connected to the secondary battery, the control means acquires the state of the secondary battery detected by the detecting means, and controls the switching of the semiconductor switch according to the state of the secondary battery.

7. A method of controlling a charge system including an electric circuit according to claim 1, control means that controls a switching of the semiconductor switch by supplying the input control signal to the electric circuit, a secondary battery that charges and discharges power, and detecting means for detecting a state of the secondary battery, the switching object line of the electric circuit being connected to the secondary battery, the method comprising:

acquiring the state of the secondary battery detected by the detecting means; and controlling the switching of the semiconductor switch according to the state of the secondary battery.

\* \* \* \* \*